United States Patent [19]
Bevan et al.

[11] 3,748,748
[45] July 31, 1973

[54] VOICE PUZZLE GAME

[76] Inventors: Jane Bevan; Brian Bevan, both of 356 Gilbert St., Ridgewood, N.J.

[22] Filed: Dec. 30, 1971

[21] Appl. No.: 214,047

[52] U.S. Cl............... 35/8 A, 35/35 C, 273/156, 274/1 R
[51] Int. Cl. ............................................. G09b 5/04
[58] Field of Search............. 35/8 A, 22 A, 39, 35/5, 6, 9 D, 31 C, 35 D; 274/1 A, 1 H

[56] References Cited
UNITED STATES PATENTS

| | | | |
|---|---|---|---|
| 2,416,959 | 3/1947 | Segal | 35/22 A |
| 3,015,895 | 1/1962 | Stall | 35/35 D |
| 3,371,933 | 3/1968 | Weitzner | 35/6 X |
| 1,823,130 | 9/1931 | Smith | 35/5 X |
| 1,271,641 | 7/1918 | Werwath | 35/19 A |
| 3,289,325 | 12/1966 | Shreck | 35/8 A X |

*Primary Examiner*—Wm. H. Grieb
*Attorney*—Kenneth S. Goldfarb, Esq.

[57] ABSTRACT

The essence of the invention resides in a voice puzzle having a board with a plurality of varied shaped openings therein. Each of said varied shaped openings having a word, sound or phrase associated therewith. A lower housing member supports said board. A plurality of varied shaped puzzle pieces having the same shapes of the varied shaped openings as provided are insertable therein. Each puzzle piece is adapted to fit into only one opening in the board having the same shape as the puzzle piece, each of said puzzle pieces having a word, sound or phrase associated therewith. A pressure responsive means is in communication with each of said openings and is adapted to be actuated by said puzzle piece associated with the opening when pressure is applied to the puzzle piece. A voice storage means is disposed within said lower housing member having stored thereon in discrete sections a vocal representation of each word, sound or phrase associated with each puzzle piece. A voice pick-up means is in communication with each pressure responsive means for each puzzle piece and is selectively engageable with said discrete sections on said voice storage means. A motor is in communication with said voice storage means with electrical circuit means for activating said voice storage means engageable with said pressure responsive means and also means is connected to the voice pick-up means for transmitting audible sound which is stored on said voice storage means to the user, by way of an amplifier and/or speaker.

50 Claims, 35 Drawing Figures

PATENTED JUL 31 1973 3,748,748

INVENTORS
BRIAN BEVAN
JANE BEVAN

INVENTORS
BRIAN BEVAN
JANE BEVAN

INVENTORS
BRIAN BEVAN
JANE BEVAN

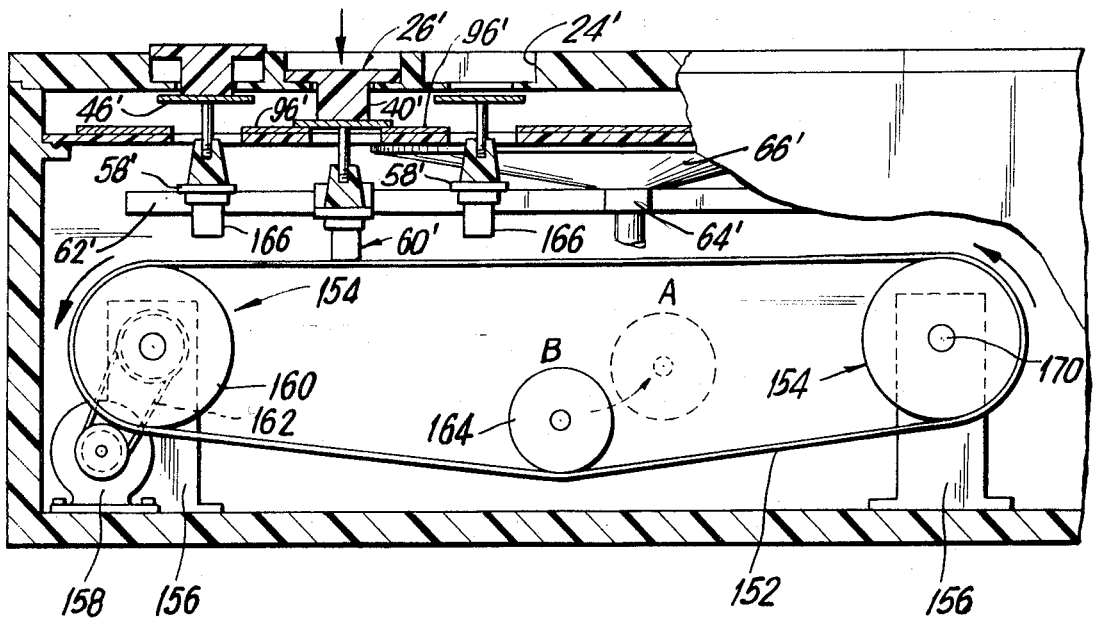
FIG. 9
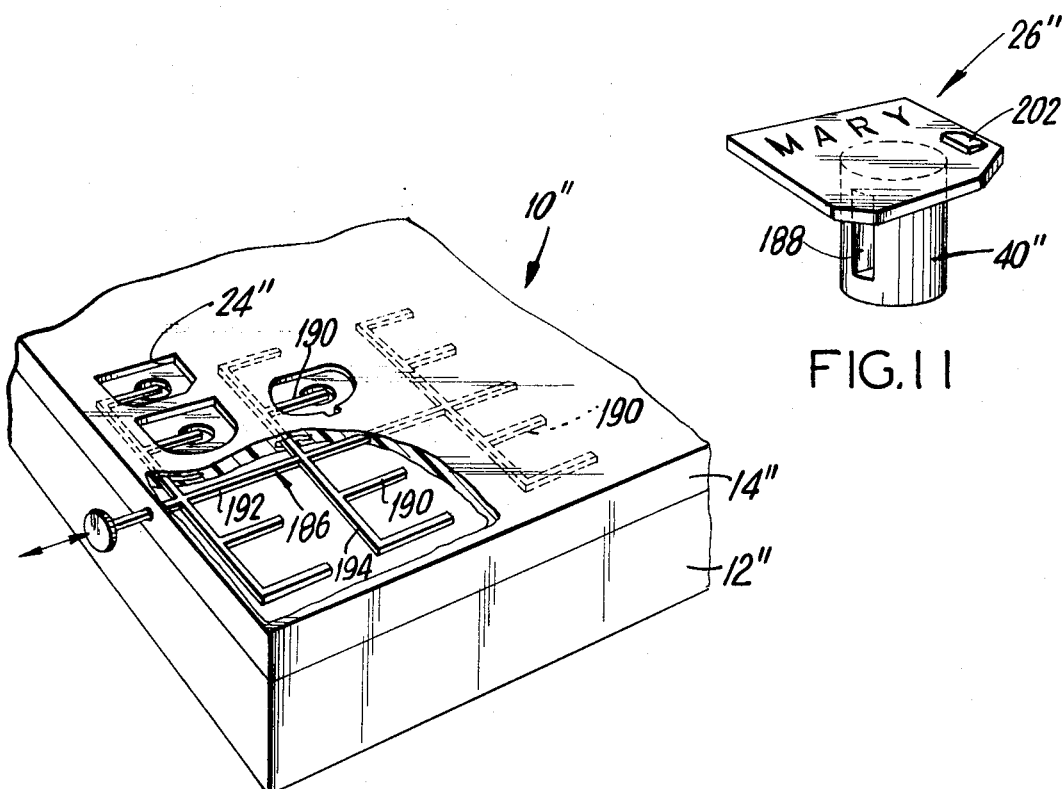
FIG. 11
FIG. 10

INVENTORS
BRIAN BEVAN
JANE BEVAN

INVENTORS
BRIAN BEVAN
JANE BEVAN

INVENTORS
BRIAN BEVAN
JANE BEVAN

VOICE PUZZLE GAME

BACKGROUND OF THE INVENTION

1. Field of the Invention

The invention relates to an educational voice toy.

2. Description of the Prior Art

Numerous prior art educational toys have appeared on the market in which sound reproduction systems have been used. For example, pull string actuated miniature phonograph discs having various orchestral instruments. The user, by turning a dial, selects an instrument to be heard and a pull string activates a recording and the music of the selected instrument is heard. Other toys utilizing the same preselection principle use a voice or instrument reproduction to play a complete saying, phrase or song when the voice box is actuated by a pull string. These devices have rather limited application and do not perform well or achieve the educational function they are alleged to provide. These prior art toys are generally of the pull string variety and are not battery operated and consequently cannot be used by some children.

The battery operated toys usually consist of a child turning an on/off knob to get a variety of different sounds after selecting the sound on a dial. This repetitious turning of the one single knob is a boring task for the child who soon loses interest in the toy.

It is the general object of the present invention to avoid and overcome the foregoing difficulties and limitations of prior art educational toys by providing a voice responsive puzzle game in which various words, sounds or phrases of a nursery rhyme, writing or saying may be randomly selected, actuated and enunciated.

Another object of the present invention is to provide puzzle elements, each element representing a word, sound or phrase so that when a puzzle element is inserted in the puzzle board and depressed, the word, sound or phrase associated only with said puzzle element will be enunciated from a voice mechanism.

A further object of my invention is to provide a system of voice identification for the blind to use as a learning tool, whereby the touch or feel of an object is identified, by audible sounds.

A further object of the present invention is to provide recorded voices or sounds which may be randomly actuated when a puzzle element is inserted in its matching puzzle opening, said puzzle piece having a specific portion of said recorded voices associated therewith.

Still another object of the present invention is to provide a voice mechanism having a voice storage member which is randomly actuated to produce an audible sound associated with an opening in a puzzle board.

Another object of the present invention is to provide an educational toy puzzle having changeable nursery rhymes, writing, sayings or sounds.

Another object of the present invention is to provide that when any one puzzle element is removed from the puzzle board the word imprinted on same will still be recognizable (by a child) as a word, and thus the art of reading will easily be developed.

It is another object of the present invention to provide an educational toy puzzle wherein any one of a multiplicity of voice pick-up means may be singularly activated by depressing any one puzzle piece element in communication therewith.

A further object of the present invention is to provide a toy puzzle which may be converted to a language translation means by interchanging a voice storage means and selecting an appropriate board which provides a word imprinted in a foreign language on puzzle pieces and also on the matching varied shaped openings so that when the puzzle piece is depressed the word in the selected foreign language is pronounced then the translation into the English equivalent will be heard emanating from the board or in the language desired to be learned.

Another object of the present invention is to provide that groups of puzzle elements with said words imprinted thereon may be removed from the board and so arranged that a child may construct different sentences or phrases with the same.

Still a further object of the present invention is to provide a voice identification of a physical object, such as a braille system.

Another object of the present invention is to provide an educational toy for teaching the identification of shapes, colors, sounds, objects, animals, letters of the alphabet, times of day and the solving of arithmetical problems, as well as teaching reading using the phonics technique and the teaching of English grammar.

SUMMARY OF THE INVENTION

The objects of the present invention have been achieved by providing an educational toy in which a complete rhyme, story, saying or writing is repeated in segments after individual puzzle elements are placed within appropriate shaped openings in a board and depressed. This is accomplished by providing a voice puzzle having a board with a plurality of varied shaped openings therein, a bottom frame member supporting said board, puzzle pieces having the same shapes of the varied shaped openings, each puzzle piece adapted to fit into only one opening in the board having the same shape, and each of said puzzle pieces and said varied shaped openings having a word phrase or sound associated therewith. Where the same word is used more than once the puzzle piece can be the same shape so that in effect you can have similar shaped puzzle pieces. It should be noted that protrusions, such as a braille system, may be also adhered on or be part of the puzzle pieces. A pressure responsive means is in communication with each of said openings and is adapted to be actuated by said puzzle piece associated with said opening. A voice storage means is disposed within said bottom frame member having stored thereon discrete sections of a vocal representation of each word, phrase or sound associated with each puzzle piece and a voice pick-up means is in communication with each puzzle piece selectively engageable with said discrete sections on said voice storage means. A motor is connected to said voice storage means, and electrical circuit means are provided for activating said voice storage means engageable with said pressure responsive arrangement and means is connected to the voice pick-up means for transmitting audible sound which is stored on said voice storage means to the user, by way of an amplifier and/or speaker.

DESCRIPTION OF THE FIGURES

For a better understanding of the present invention, reference should be had to the accompanying drawings wherein like numerals of reference indicate similar parts throughout the respective views and wherein:

FIG. 9 is a partial cross sectional view of an alternative embodiment.

FIG. 10 is a perspective view of the puzzle game showing a portion thereof cut away of an alternative embodiment.

FIG. 11 is a perspective view of an alternative embodiment of a puzzle piece.

DESCRIPTION OF THE PREFERRED EMBODIMENT

Although the invention hereinafter described is particularly adapted for the use as an educational toy puzzle the principle of the invention is broadly applicable to other educational devices such as translation machines, braille system interpreters, mechanical boxes having voice storage means contained therein, story book toys and similar educational devices such as talking color identifying toys, talking clocks, alphabet identity toys, spelling toys, geometric shape identification toys and the like.

The present description should not be considered limited to the specific structure since, as will be seen throughout the description, its application is much wider and may be used in allied fields of toys and educational objects.

Figure 1:
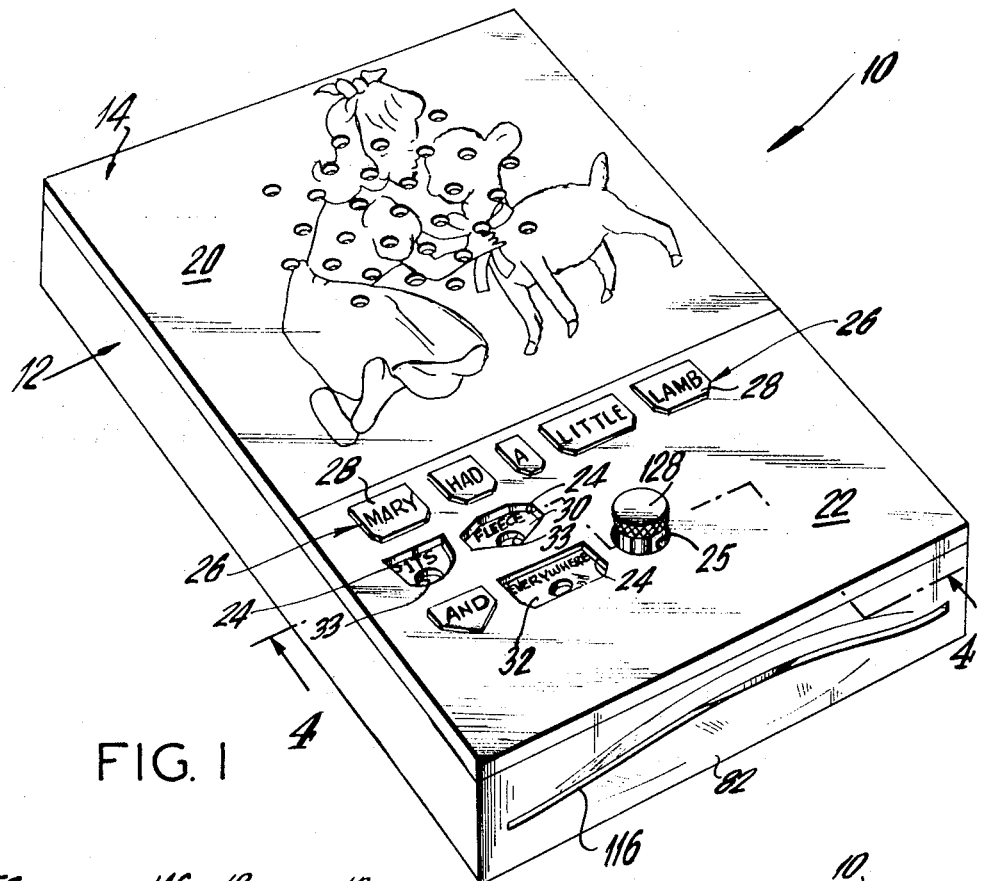
FIG. 1 is a perspective view of the toy puzzle.

Referring now to FIG. 1 an educational toy voice responsive puzzle game is generally indicated by the reference numeral 10. The toy puzzle 10 may be provided with a generally rectangular box-like arrangement preferrably manufactured of plastic material wherein the lower housing member 12 is provided with a board 14 thereover. The positioning of the board 14 over the lower housing means 12 will totally enclose the interior section 16 of the rectangular box-like arrangement. The board 14 is removably attached to the upper edges 18 of the lower housing member 12 in such a manner that the board 14 may be interchangeable with other prepared boards, as will become apparent as the description proceeds.

The board 14 is provided with an upper section 20 and a lower section 22. The upper section 20 may have disposed thereon a pictorial representation in some ornate and colorful fashion of a nursery rhyme or other representation of a writing or saying. It should be noted that various ornate configurations may be applied to the upper section 20 of the board 14 and the purpose of the representations are merely to represent the nursery rhyme, writing or saying to provide a visual stimuli to the user. The pictorial representations will have its audible representation heard by the user during the operation of the toy puzzle 10.

In the lower section 22 of the board 14 there are provided a plurality of dissimilar oddly shaped openings 24. The board 14 is also provided with an oversized hole 25 in the lower section 22. For each individual oddly shaped opening 24 there is provided a matching oddly shaped puzzle piece 26 which is insertable in its respective matching oddly shaped opening 24. Each puzzle piece 26 may represent a word, sound or phase of a nursery rhyme and may have the word, sound or phrase it represents in some manner indicated upon its top surface 28.

In order to prevent the puzzle piece from falling into the lower housing member 12 after insertion into the opening 24 and for other reasons which will become apparent, the board 14 may be formed in such a manner that at the bottom of each oddly shaped opening 24 there is formed an enlarged lip 30 which defines a universal opening 33 therethrough. The lip 30 also defines a bottom surface 32 of the oddly shaped opening 24 and the word, sound or phrase associated with that respective puzzle piece may be imprinted upon the bottom surface 32 such that the spelling of a word, sound or phrase is visible when there is no puzzle piece 26 inserted in the opening 24. The totality of the words, sounds or phrases may also be depicted on the upper portion 20 of the board 14 instead of a pictorial representation, depending upon the application of the toy puzzle. However, it is preferred that a pictorial representation appears when the invention is used as a toy puzzle; for example, as partially shown in FIG. 1, if the nursery rhyme "Mary Had A Little Lamb" was depicted in an appropriate fashion on the upper portion 20 of the board 14, each of the oddly shaped puzzle pieces 26 would represent a single word in the nursery rhyme, such word being imprinted upon the top surface 28 of each puzzle piece 26.

It should be noted further that these very same words (appearing on the puzzle pieces) are imprinted upon the bottom surface 32 of each oddly shaped opening 24 so that even without the puzzle pieces 26 inserted in their respective oddly shaped openings 24, when viewing the lower section 22 of the board 14, the entire nursery rhyme, in its totality, can be read from the words imprinted on the bottom surfaces 32 of the oddly shaped openings 24. It should be further noted that in place of the imprinted words, sounds, objects, shapes, colors, protrusions or other voice identifiable objects may be so depicted on the respective surfaces 28 and 32.

In order to provide the user of the voice puzzle with a clearer understanding of the word, sound or phrase imprinted upon the top surface 28 of each puzzle piece 26 and to compliment the educational process of supporting the printed word, sound or phrase with an audible sounding of the word, sound or phrase, a voice storage means 34, is provided and is releasably connectable within the lower housing member 12. Each of the oddly shaped puzzle pieces 26 is provided with an upper portion 36 and a lower portion 38 the upper portion 36 taking the form of the puzzle piece 26 which is permitted to be placed into the oddly shaped opening 24 and is so formed as to permit the insertion in only one position. This structural shape is provided so that the puzzle piece 26 cannot be reversed when inserted into the oddly shaped opening 24. The lower portion 38 of each oddly shaped puzzle piece 26 is formed as a downwardly extending protrusion 40, having a preferrably rounded cross section.

Figure 6:
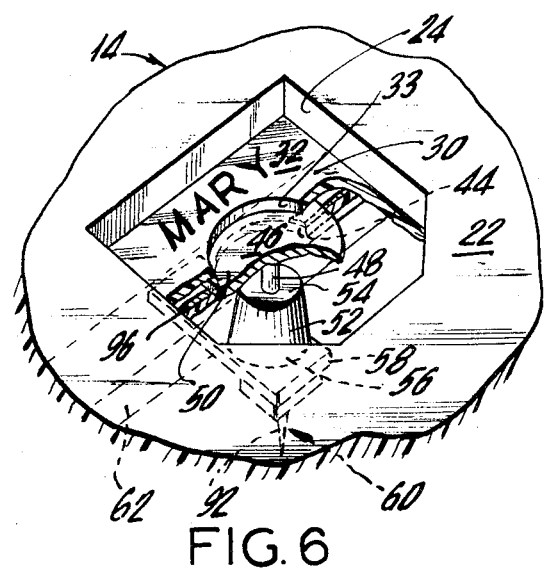
FIG. 6 is a perspective view of an oddly shaped opening and showing a part thereof in cross section.

As shown in FIGS. 1 and 6, the opening 33 in the bottom surface 32 is round so that in this case the protrusion 40 would be round. The downwardly extending protrusion 40 may be in the form of a square or circular portion depending upon the shape of the universal opening 33 and the protrusion 40 is adapted to fit into the opening 33 created by the lips 30 of the oddly shaped opening 24. Disposed beneath the board 14 there is provided a cover member 42 having a plurality of holes 44 therethrough each of the holes 44 in said cover being in registry with the holes 33 in the bottom surfaces 32 of the oddly shaped openings 24. The material from which the cover 42 is made may be a relatively thin plastic sheet or some other material which is electrically nonconductive. A cap 46 mounted on a rod 48 is movably insertable in the hole 44 in the cover 42, and the rod 48 may move reciprocally vertically within the hole 44. The cap 46 may take the form 0f a flat metallic disc 50 or some other electrically conductive material may be utilized to form the cap. The cap 46 is positioned immediately below the opening or hole 33 formed in the bottom surface 32 of the oddly shaped opening 24 such that the downwardly protruding member 40 of the puzzle piece 26 mah physically contact the cap 46 when downward pressure is exerted on the puzzle piece 26 and therefore may move the cap 46 and rod 48 downwardly. The rod 48 may be connected at its remote end to a grommet 52. The grommet which is preferrably made of a non-sound absorbing material may take the form of an inverted cone-shaped element having its smaller diameter at the upper end thereof. The larger flat diameter is situated at the lower end 56 thereof thereby having its largest diameter disposed downwardly. The lower end 56 of the grommet 52 with its widest diameter is connected to a leaf spring member 58 having a voice pick-up means 60 connected to one end thereof and extending downwardly therefrom while the remote end of the leaf spring member 58 is connected to a sound transmission means 61. The sound transmission means 61, in the preferred embodiment, takes the form of a plurality of sound transmission arms 62 which extend laterally from a main sound transmission member 64.

Figure 3:
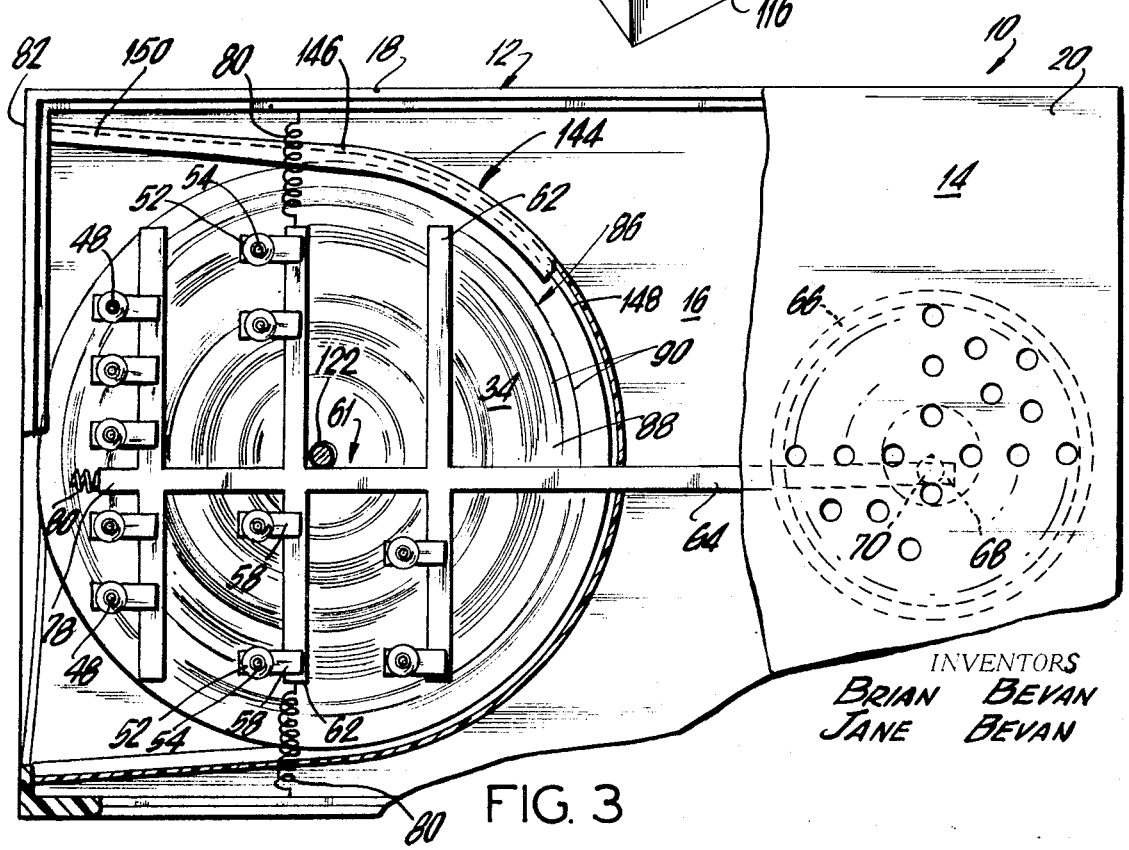
FIG. 3 is a partial plan view partially in section showing the interior of the lower housing member.
Figure 2:
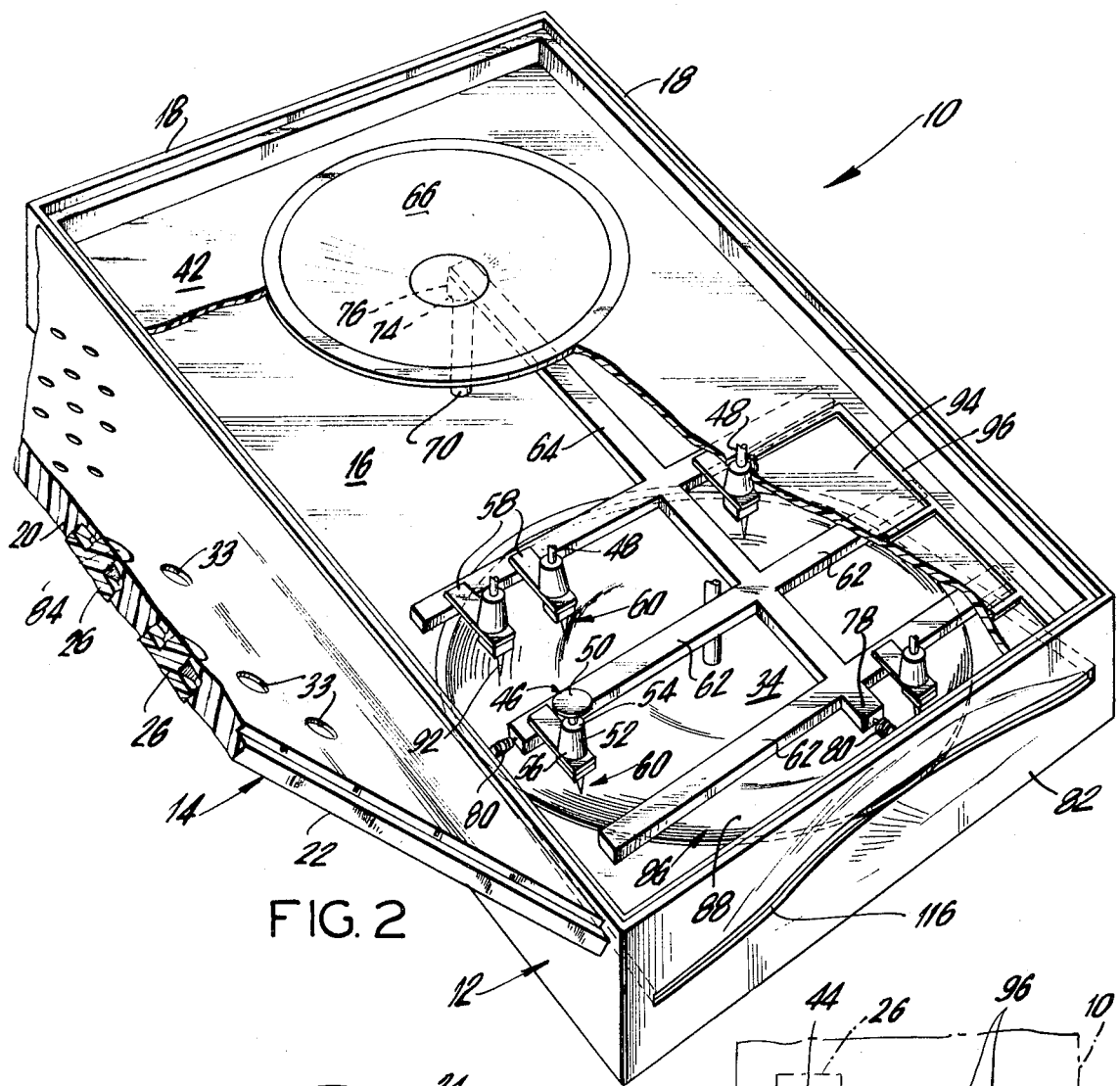
FIG. 2 is a perspective view of the toy puzzle with the board open.

As shown in FIG. 3, the sound transmission arm 62 is an integrally molded portion of a main sound transmission member 64. As shown in FIGS. 2 and 3 a plurlaity of sound transmission arms 62 are provided and are integrally molded with the main arm 64 so that each of the voice pick-up means 60 that are connected to a sound transmission arm 62 are also in communication with the main sound transmission arm 64. The sound transmission arms 62 and main sound transmission member 64 are adapted to transmit vibrations taken from the voice storage means 34 by the voice pick-up means 60 and communicates those sound vibrations to a sound amplifier 66 which may take the form of a speaker and which is in physical engagement with the distal end 68 of the main sound transmission member. The distal end 68 of the main sound transmission member 64 is held in physical contact with the sound amplifier 66 by means of a post 70. The post 70 has one end thereof engaged with the floor 72 of the lower housing member 12. The other end 74 of the post 70 is provided with a non-sound absorbing means 76 which is urged against the main sound transmission member 64 firmly engaging the distal end 68 thereof against the sound amplifier 66. The front end 78 of the main sound transmission member 64 may be supported in the position shown in FIG. 2, by means of a resilient member such as a spring 80 connected between the front end 78 and the front wall 82 of the lower housing member 12. The ends of sound transmission arms 62 may likewise be supported by springs 80 to the side walls of the lower housing member 12 as shown in FIGS. 2 and 3.

Figure 4:
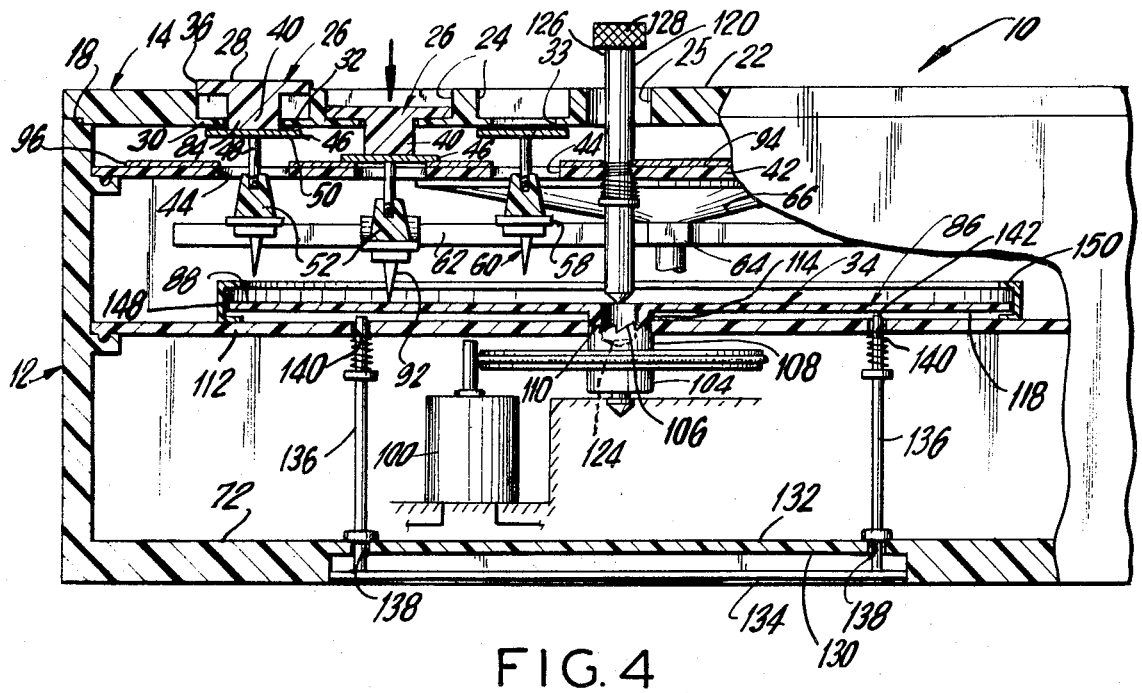
FIG. 4 is a cross sectional view taken along the lines 4—4 of FIG. 1.
Figure 5:
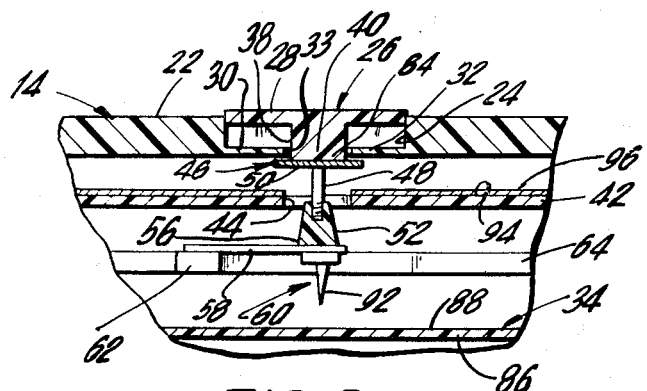
FIG. 5 is a partial cross sectional view of the pressure responsive means.
Figure 7:
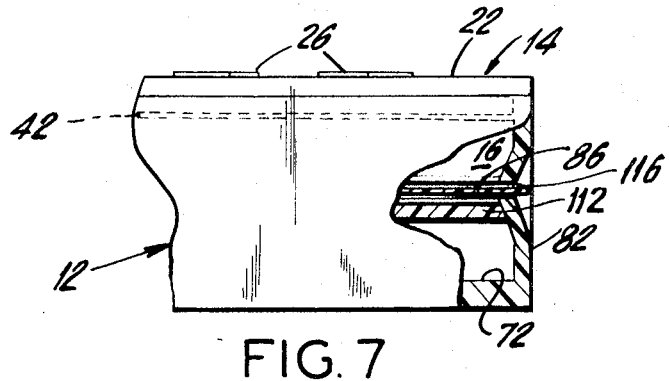
FIG. 7 is a partial cutaway of the side view of the lower housing member.

As shown in FIG. 4, when a puzzle piece 26 is inserted into its respective oddly shaped opening 24 the lower end 84 of the downwardly extending protrusion 40 will seat against the top surface of the cap 46. When downward pressure is applied to the puzzle piece 26, the cap will be urged downwardly and the grommet 52, which acts in unison with the cap 46, will move downwardly against the top surface of the leaf spring 58 bending the same which will urge the voice pick-up means 60 into physical contact with the voice storage means 34. When the puzzle piece 26 is released, i.e., downward pressure is released, the leaf spring 58 will urge the grommet 52, rod 48, cap 46 and puzzle piece 26 upwardly. The movement of the cap 46 against the downwardly extending protursion 40 will urge the puzzle piece 26 upward and the voice pick-up means 60 will be disengaged from its physical contact with the voice storage means 34.

As shown in FIGS. 2, 3, 4 and 5, the preferred embodiment of the invention suggests the use of a record disc 86 as the sound storage means. Disposed on the upper surface 88 of each record disc 86 are discrete groups of grooves 90 which are positioned directly beneath the plurality of voice pick-up means 60. The position of one discrete group of grooves 90 is in registry with one specific voice pick-up means 60 which is associated with one specific puzzle piece 26 having a word, sound or phrase indicated on the upper surface 28 of the puzzle piece 26. In this manner, the discrete group of grooves 90 will contain the word, sound or phrase associated only with that specific puzzle piece 26. Each of the sound pick-up means 60 representing individual words, sounds or phrases has assigned to it a discrete set of grooves 90 in which is stored the word, sound or phrase imprinted upon the upper surface 28 of the puzzle piece 26, and each discrete group of grooves 90 is in perfect registry with its respective voice pick-up means 60. In this manner, the depression of the puzzle piece 26 will actively engage its associated voice pick-up means 60 with the discrete group of grooves 90 associated with the verbiage imprinted upon the upper surface 28 of the puzzle piece 26.

Figure 8:
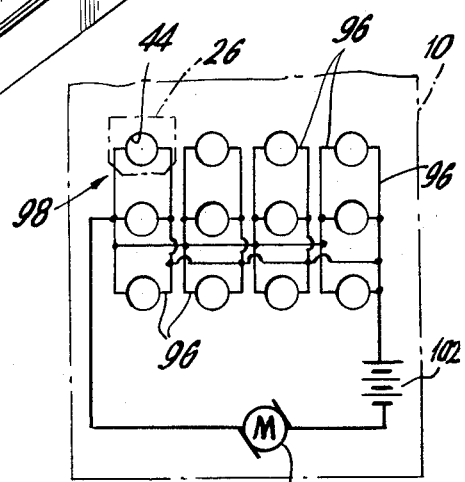
FIG. 8 is a schematic drawing of the electrical circuitry.

In order to activate the movement of the voice storage means 34 when a puzzle piece 26 is depressed so that the voice pick-up means 60, in the form of a record needle 92, will actively engage the rotating record disc 86, the upper surface 94 of the cover 42 is provided with a plurality of conduits 96 (shown in FIG. 8). The conduits 96 comprise individual circuits 98 connecting a motor 100 to a source of electrical energy 102 such that when the metallic disc 50 is urged downwardly by the puzzle piece 26 it closes over the hole 44 in the cover member 42 and contacts the conduits 96 closing the electrical circuit 98 and activates the motor 100. The motor 100 is coupled to drive shaft 104 which is provided with a plurality of ratchet teeth 106 on its upper end 108. The drive shaft 104 is rotatable in an aperture 110 in a supporting plate 112 disposed above the motor 100. The record disc 86 is of a conventional form but has a downwardly extending hub portion 114 which is adapted to slide into the aperture 110 in the support plate 112 and to mate with the ratchet teeth 106 on the drive shaft 104. When a record disc 86 is inserted into a slot 116 in the front wall 82 of the lower housing, the downwardly extending hub portion 114 will locate itself in the aperture 110 in the support plate 112 and will engage the ratchet teeth 106 on the drive shaft 104, as shown in FIG. 4. The downwardly extending hub portion 114 when engaged with the ratchet teeth 106 will hold the bottom surface 118 of the record disc 86 a fraction of an inch above the support plate 112 so that record disc 86 is free to rotate.

In order to maintain the record disc 86 in locked engagement with the drive shaft 104, a spring loaded rectractable pin 120 is adapted to fit through the oversized hole 25 in the board 14 and through a center aperture 122 in the record disc 86 and project therethrough into a recess 124 in the upper end of the drive shaft 104. As may be seen in FIG. 4, the record disc 86 may rotate around the pin 120 and the combination of the spring actuated retractable pin 120 through the center aperture 122 in the record disc 86 and its engagement in the drive shaft 104, will maintain the record disc 86 in perfect position throughout its rotative movement. The upper end 126 of the pin 120 projects through the board 14 and has a knob 128 disposed thereon so that if the record disc 86 is to be changed the knob 128 may merely be pulled up disengaging the pin 120 from the aperture 122 in the record 86 so that the record 86 may be lifted in an appropriate manner and slid out the slot in the frame. The oversized hole 25 in the board 14 is sufficiently large so that the knob 128 may fit therethrough when and if the board is to be changed.

As shown in FIG. 4, when the record 86 is in its appropriate position for being rotated its downwardly extending hub portion 114 fits into the aperture 110 in the support plate 112. In order to slide the record 86 out of the slot 116 in the front wall 82 of the housing 12 the record 86 must be raised so that its downwardly extending hub portion 114, which in operation mates with the ratchet teeth 106 on the drive shaft 104, must be disengaged from the aperture 110. To this end, a recess 130 is in the bottom wall 132 of the lower housing 12 into which an elongated plate 134 may be fitted to move vertically up and down. As shown in FIG. 4, a pair of arms 136 extend upwardly from the elongated plate 134 through a pair of holes 138 in the bottom wall 132 of the lower housing 12. The arms 136 extend upwardly and are adapted to fit through a pair of holes 140 in the support plate 112 and are spring loaded so that the ends 142 of the arms 136 extend into but not normally through the holes 140 When the elongated plate 134 is urged upwardly the tip ends 142 of the arms 136 will force the record 86 upwardly so that the downwardly extending hub portion 114 is disengaged from the aperture 110 in the support plate 112. Structurally, the record disc 86 when inserted into the slot 116 in the front wall 82 of the lower housing 12 is guided into a position by a record guide means 144 which is in the form of curved side walls 146 with a channel 148 therein which directs the record 86 to such a position that this downwardly extending hub portion 114 may be engaged in the aperture 110 in the support plate 112. The record 86 when placed into the slot 116 is guided by the guide means 144 to slide along the upper surface of the support plate 112 until the hub portion 114 mates with the aperture 110. As shown in FIG. 3, the guide means 144 merely takes the form of a semi-circular wall forming the bottom end of the suide means 144 with outwardly flared linear wall surfaces. The channel 148 therein provides an overhang 150 large enough to prevent the record 86 from falling against the voice pick-up means 60 in the event that the lower housing member 12 is inverted. It should be noted that the position of the side walls urge the record disc 86 to one particular position and when the disc is in that approximate position the spring loaded retractable pin 120 which has been upward to permit the free movement of the record on the support plate 112 is then released so that the pin 120 will urge its way into the center aperture 122 in the center of the record 86 and passes through the record 86 and engages in the recess 124 in the drive shaft 104.

In operation of the preferred embodiment, a record disc 86 is inserted in the slot 116 and the spring loaded retractable pin 120 is raised by pulling the knob 128 upwardly. The downwardly extending hub portion 114 of the record disc slides along the upper surface of the support plate 112 and is guided into the aperture 110 of the support plate 112 by the guide means 144. The hub portion 114 thereafter engages the ratchet teeth 106 on the upper end 108 of the drive shaft 104 and the spring loaded retractable pin is released so that the pin passes through the center aperture 122 of the record 86 and maintains the record 86 in a rotatable position on the drive shaft. With the board 14 disposed on the lower housing 12, a puzzle piece 26 representing a word, sound or phrase is placed in its respective oddly shaped opening 24 so that the downwardly extending protrusion 40 fits into the hole 33 in the bottom surface 32 of the oddly shaped opening 24. When the user of the game depresses the puzzle piece 26, the downwardly extending protrusion 40 engages the metal cap 46 and urges the same downwardly so that the cap 46 (metallic disc 50) contacts conduits 96 disposed on the upper surface 94 of the cover member 42 thereby closing an individual circuit 98 between the source of electrical energy 102 and the motor 100 causing the drive shaft 104 to rotate. Simultaneously, with the actuation of the drive shaft 104, the depressed cap 46 urges the front end of the leaf spring 58 downwardly so that the voice pick-up means 60 comes in contact with its respective discrete group of grooves 90. With the voice pick-up means 60 in contact with its respective discrete sections 90 on the voice storage means 34, the sound contained in the grooves is transmitted through the voice pick-up means 60, the leaf spring 58, the sound transmission arm 62 and the main sound transmission member 64 to the sound amplifier 66. In this manner, the user of the toy puzzle 10 will have the audible representation of the verbiage printed on the upper surface 28 of the puzzle piece heard by depressing the puzzle piece 26 in its respective oddly shaped opening 24. Thus, a child utilizing the teachings of the present invention will associate the audible recorded word, sound or phrase with its corresponding printed word, sound or phrase on the upper surface 28 of the puzzle piece 26 and thus the learning process will have commenced.

Alternatively, as shown in FIG. 9, the record disc 86 may be replaced by a tape belt 152. The tape belt 152 maybe mounted for rotative movement on a pair of rollers 154, which rollers are mounted for rotation in brackets 156. A motor 158 may be connected by any convenient manner to one drive roller 160 such that when an electrical circuit 98 is closed, the motor 158 through the belt drive arrangement 162 will cause the drive roller 160 to rotate. An idler roller 164 is provided and may be movable between a loading position A and an operating position B. The operating position B of the idler roller 164 is shown in FIG. 9 and the load position A of roller 164 is shown in phantom. In the alternative embodiment, shown in FIG. 9, the means for engaging the voice pick-up means 60' with the tape belt 152 is identical to that shown and described with respect to the preferred embodiment. Obviously, the mechanism for supporting a record disc is not required with the use of the tape belt 152.

Referring again to FIG. 9, the depression of the puzzle piece 26' in the oddly shaped opening 24' will move the downwardly extending protrusion 40' against the cap 46' which in turn will act to cause the depression of the front end of the leaf spring 58'.

The depression of the cap 46' will contact a pair of electrical conduits 96' closing an individual circuit 98 (not shown) and cause the motor 158 to rotate. The pulley belt arrangement 162 will drive the drive roller 160 and cause the tape 152 to rotate horizontally in accordance with the arrows shown in FIG. 9.

In the place and in the stead of a record needle shown in the preferred embodiment, the voice pick-up means 60' may take the form of a magnetic head 166. Each magnetic head 166 being disposed directly above and in alignment with a section of tape 152 which has the voice representation of the imprinted word, sound or phrase on the upper surface of the puzzle piece 26'. The downward urging of the front portion of the leaf spring 58' will move the magnetic head 166 into physical contact with a section of the tape 152 and the voice impulses will be transmitted through conduits 178 disposed on the sound transmission arm 62' and main sound transmission member 64' to a sound amplifier 66'. Such connection will be hereinafter described in more detail.

It should be noted that since the tape rotates horizontally across the lower housing 12', the voice pick-up means 60' are off-set such that each individual sound pick-up means 60' is disposed directly over its own associated section of the tape belt 152.

Figure 12:
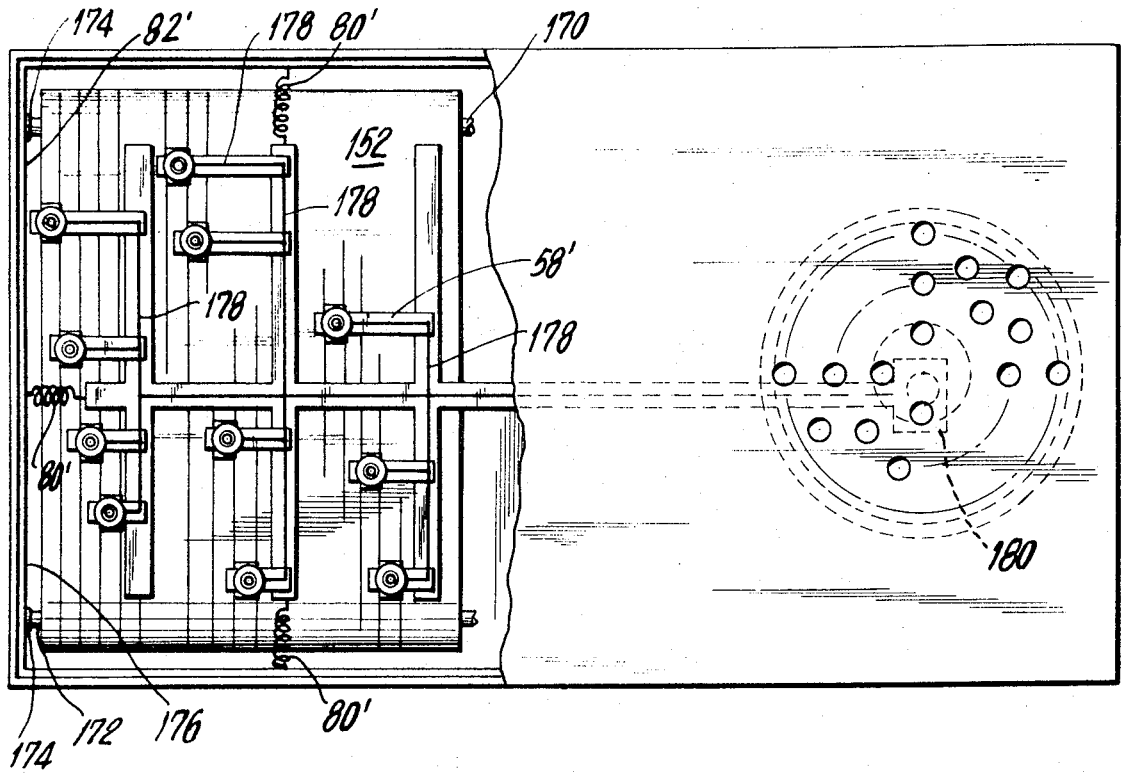
FIG. 12 is a plan view partially cut away of the lower housing member.

As previously described with respect to the preferred embodiment the board 14' containing the oddly shaped openings 24' may be changed to provide different combinations of words, sounds or phrases and when the board 14' is changed, the tape belt 152 may be changed to provide appropriate words, sounds or phrases that may be imprinted upon the individual puzzle pieces 26'. In order to change the tape belt 152, the idler roller 164 may be moved from its operating position B to its loading position A by swinging the idler roller 164 upwardly in the direction of the dashed arrow shown in FIG. 9. The tape 152 may be slid from the rollers 154 toward the front wall 82' as shown in FIG. 12. Each roller 154 is supported for rotating motion by a shaft 170. The rear end of the shaft 170 being rotatably supported in the brackets 156. The front wall 82' of the lower housing means may be removable so that access may be had to the interior of the lower housing member 12' so that the tape belt 152 may be removed. The front ends 172 of the shafts 170 may be supported by fold-down brackets (not shown) or cup-like bearing surfaces 174 may be provided on the inner surface 176 of the front wall 82' to provide rotative support for the front ends 172 of the roller shafts 170. In either case, means is provided by virtue of the removable cup-like bearing surfaces 174 for the front ends 172 of the roller shaft 170 so that the tape belt 152 may be removed from the roller 154 when the tape belt 152 is to be changed.

As previously indicated above, the voice pick-up means 60' may take the form of a magnetic head 166. The arrangement to transmit impulses to be converted to audible sound may be provided by connecting individual wires 178 along the sound transmission arms 62' connecting each of the magnetic heads 166 directly to a sound amplifier 180 and thence to a speaker 66'.

Figure 14:
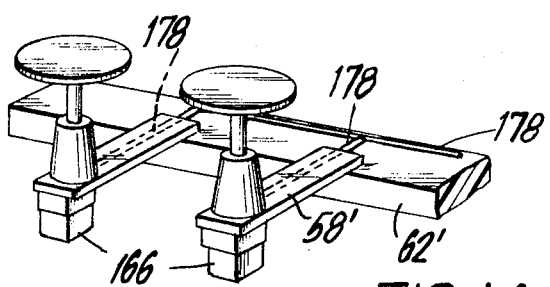
FIG. 14 is a perspective view showing the use of directly coupled sound transmission means.

As shown in FIG. 12, the magnetic head 166 on the leaf spring member 58' is electrically connected to a conduit 178 which runs along the sound transmission arm 62' to the main sound transmission member 64' and is directly connected to a terminal which is a direct electrical connection with the sound amplifier 180. In FIG. 14, there is shown the arrangement for transmitting the information obtained from the voice storage means 34' to the speaker 66'. I provide individual sound or impulse conduits 178 which are connected between the individual voice pick-up means 166 and the sound amplifier 180.

Figure 15:
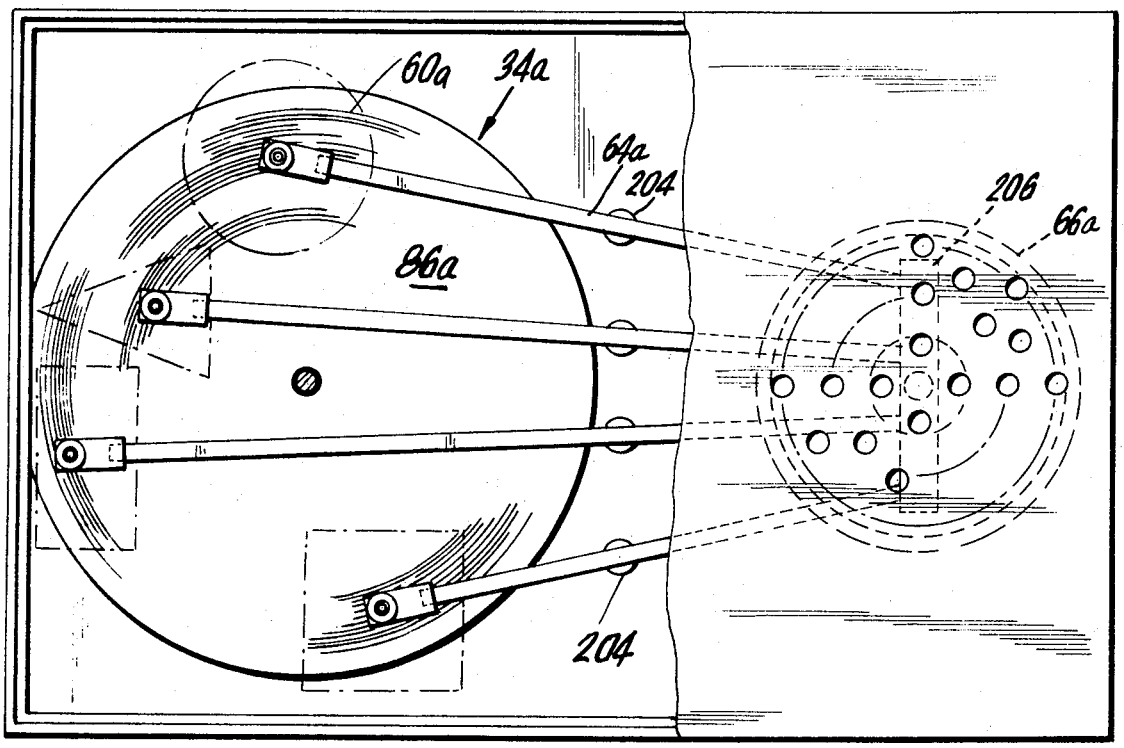
FIG. 15 is a partial plan view of an alternative means for transmission of sound.

A further alternative means of transmitting the sound vibrations from the voice pick-up means 60a to the sound amplifier 66a is shown in FIG. 15. With this alternative embodiment, the voice pick-up means 60a is directly connected to the sound amplifier 66a by means of a main sound transmission member 64a. The main sound transmission member 64a may be supported by a post 204 having one end of the sound transmission member 64a connected directly to the voice pick-up means 60a and having its remote end connected to a plate member 206 which is connected to the back of the sound amplifier 66a. It should be noted that this alternative means of transmitting the sound vibrations from the voice pick-up means 60a to the sound amplifier 66a is to be used when a record disc 86a is used as the voice storage means 34a. As shown in FIG. 15, each of the individual voice pick-up means 60a directly coupled to the plate member 206 thereby making a direct connection between the voice pick-up means 60a and the sound amplifier 66a.

A structural arrangement for maintaining each puzzle piece in its respective oddly shaped openings 24" is shown in FIGS. 10 and 11. The board 14" is so constructed as to permit a puzzle piece retaining member 186 to slide therein from a locking position to an unlocking position. The position shown in FIG. 10 is the locking position. Each downwardly extending protrusion 40" of the puzzle piece 26" is provided with a vertical slot 188 therein which is adapted to receive a rod 190 which may be slidably engageable within the slot 188. The puzzle piece retaining member 186 is comprised of a main stem 192 having arms 194 extending outwardly therefrom. Each of the arms 194 is provided with a plurality of rods 190 which extend parallel to the main stem 192. Each rod 190 extends into an oddly shaped opening 24" through one side wall of the oddly shaped opening 24". The puzzle piece retaining member 186, as previously indicated, is slidable between a puzzle piece retaining position and a puzzle piece release position.

When the puzzle piece retaining member 186, is in position as shown in FIG. 10, each rod 190 will be engaged in the slot 188 in the downwardly extending protrusion 40" of the respective puzzle pieces 26". The depth of the slot 188 will permit the vertical depression of each puzzle piece 26" sufficiently so that the bottom edge of the downwardly extending protrusion 40" may contact the cap 46 and urge the voice pick-up means 60 into contact with the voice storage means 134. It should be noted that the depth of the slot 188 should be sufficient to permit the downward movement of the puzzle piece 26" with the rod 190 disposed within the slot 188 so that the voice pick-up means 60 may be urged into contacting relationship with the voice storage means 34. In this manner, each puzzle piece 26" is physically maintained within the confines of its respective oddly shaped opening 24" thereby preventing the loss of the puzzle pieces 26". If the user wants to use the voice puzzle game 10" as a puzzle he merely need pull the puzzle piece retaining member 186 outwardly (as shown by the arrow) from the broad 14" and the rods 190 will disengage from their respective slots 188 as well as from the downwardly extending protrusion 40" of the puzzle pieces 26" thereby releasing the puzzle pieces 26" so that they can be removed from their respective oddly shaped openings 24".

Figure 13:
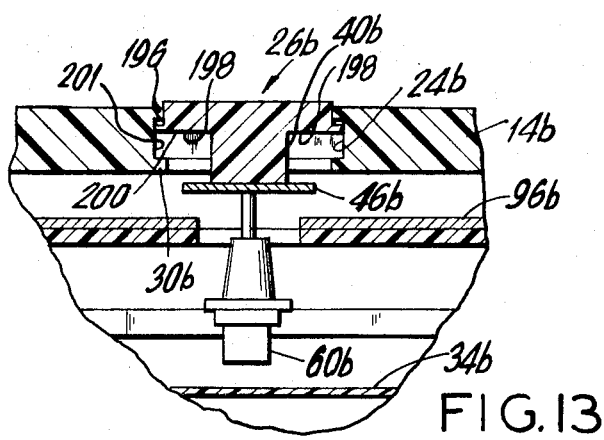
FIG. 13 is a partial cross sectional view of an alternative puzzle piece.

It is also contemplated by the structure of this invention to eliminate the removable nature of the puzzle pieces. As shown in FIG. 13, each oddly shaped opening 24b is provided with an over extending edge 196 at the upper edge of the opening. The bottom edge 198 of the puzzle piece 26b is provided with an outwardly flared rim 200 which cannot be pulled upwardly past the edge 196. As shown in FIG. 13, the puzzle piece 26b is depressable in the downward direction to urge the voice pick-up means 60b into contact with the voice storage means 34b thereby accomplishing the purposes set fath above. A channel 201 is formed between the over extending edge 196 and a lip 30b which permits the vertical excursion of the flared rim 200. The depth of the channel 201 being sufficient to permit the downwardly extending protrusion 40b to urge the cap 46b and voice pick-up means 60b into contacting relation with the conduits 96b and voice storage means 34b respectively. It should be noted that this alternative embodiment does not in any manner impede the changeability of the board 14b.

Figure 16:
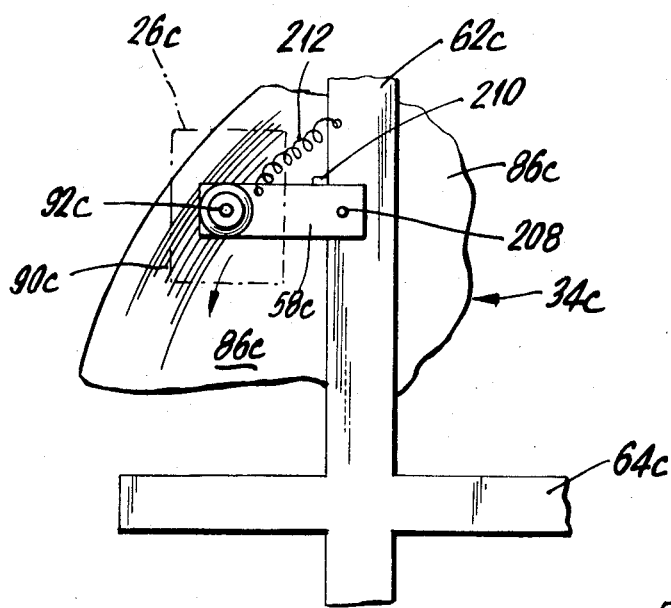
FIG. 16 is a pictorial representation of an alternative arrangement for the voice pick-up means.

Reference is now made to FIG. 16 with the normal contemplated positions of the voice storage means 34c and its contact by the voice pick-up means 60c the discrete sections or groups of grooves 90c on the voice storage means 34c will not require the lateral movement of the record needle 92c since the verbiage associated with each puzzle piece may be fitted into one or two grooves on the record disc 86c. However, in the event more than one or two grooves are required to enunciate a voice description of the material for a particular puzzle piece 26c, I provide an alternative means to permit the limited lateral excursion of the record needle 92c during its use and provide for the proper realignment of that record needle 92c after the puzzle piece 26c has been released and the record needle 92c is no longer in contact with the record disc 86c. Such alternative embodiment is shown in FIG. 16 whereby the leaf spring 58c is connected to the sound transmission arm 62c by means of a pivot 208. Connected to the sound transmission arm 62c is a stop 210 which will prevent the movement of the pivotable leaf spring 58c in one direction, however, the leaf spring 58c may move in the direction of the arrow so that when the record needle 92c rides in the grooves on the record disc 86c the leaf spring 58c and record needle 92c may move in the direction of the arrow. In this manner, the record needle 92c may cover more than one or two grooves in the record disc 86c without distorting the leaf spring member 58c while the puzzle piece associated with the voice pick-up means 60c is depressed and the needle is in contact with the record disc. When the voice puzzle piece is released a spring member 212 connected between the leaf spring 58c and the sound transmission arm 62c will pull the pivotally movable leaf spring 58c back against the stop 210 and hold the same in that position. With this arrangement, the record needle 92c is in proper registery with the grooves 90c in the record disc 86c so that when the puzzle piece associated with the particular grooves 90c is depressed the needle 92c will fit into the grooves in proper registration therewith and the verbiage stored on the record disc will be enunciated. It should be noted that the alternative embodiment herein above described, which permits the lateral excursion of the leaf spring 58c, is utilized when the record disc 86c is used as the voice storage means 34c.

As shown in FIG. 11, an upward extending protrusion 202 may be integrally formed with the flat portion of each puzzle piece 26″ to aid the user in removing the puzzle piece 26″ from its respective oddly shaped opening 24″.

It should be noted that although 4 or 5 puzzle pieces are shown per line in FIG. 1, the invention is not limited to that number of pieces per line since more or less numbers of puzzle pieces may be used depending upon the size of the puzzle pieces being used on the board. The preferred embodiment and the alternative embodiments set forth may be adapted to various types of learning devices since one of the objects of the present invention is to utilize the voice puzzle toy as an educational tool. The toy may be adapted to be used to identify objects, colors, geometric forms, protrusions in the form of braille, mathematical concepts such as addition, subtraction, multiplication and division and word definitions. Also, the structure of the voice puzzle toy is also well adapted to use as a translation tool or as an educational tool for learning a new language.

Figure 17:
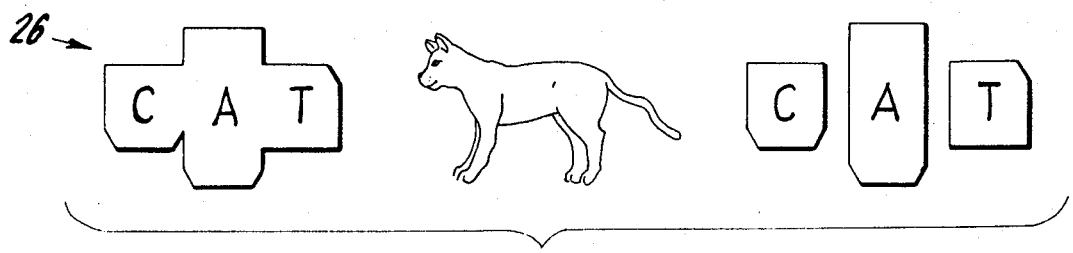
FIG. 17 is a pictorial representation of an alternative puzzle piece arrangement.

FIG. 17 shows on the left hand side a single puzzle piece 26 with the word C-A-T imprinted on its upper surface 28 reposing in its respective oddly shaped or matching opening 24. The center figure of FIG. 17 shows a pictorial representation of a cat and that representation appears on the upper surface of the board 14.

In the right hand figure, of FIG. 17, are shown three separate puzzle pieces 26, each puzzle piece having a letter imprinted on its upper surface 28 so that when the puzzle pieces 26 are placed in their correct positions in the oddly shaped opening 24 the word C-A-T will be properly spelled out. When any one of the three puzzle pieces 26 which form the word C-A-T is placed in its respective oddly shaped opening 24 and is depressed the voice storage means 34 is activated, as previously described in the preferred and alternative embodiments and the phonetic enunciation of the letter imprinted on the upper surface 28 of the depressed puzzle piece 26 is repeated. When the puzzle piece 26 in the left hand figure, in FIG. 17, is inserted into its respective oddly shaped opening 24 and depressed the voice storage means 24 is activated as previously described and the word C-A-T is enunciated followed by the phonetic pronunciation of the letter C then the letter A then the letter T. In the right hand figure of FIG. 17 are the three individual puzzle pieces 26. When any one of these three puzzle pieces 26 is inserted into its respective oddly shaped opening 24 and depressed the phonetic enunciation of the letter imprinted on the upper surface 28 is repeated thus a child or user of the toy puzzle will associate the audible recorded phonetic sound with the imprinted letter on the upper surface 28 of the matching puzzle piece 26. In this manner, the user of the puzzle will become proficient in reading since the user will learn the phonetic pronunciation of letters and will piece them together to form words.

Figure 18:
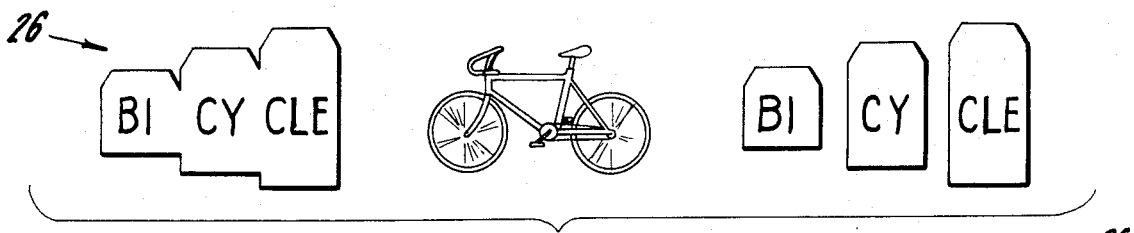
FIG. 18 is a pictorial representation of an alternative puzzle piece arrangement.

FIG. 18 illustrates how the toy puzzle may be utilized as an educational tool for teaching the reading of words constructed from syllables. The left hand figure of FIG. 18 shows a single puzzle piece 26 with the word BICYCLE imprinted on the upper surface 28 of the puzzle piece 26 and reposing in its associated oddly shaped opening 24. The center figure of FIG. 18, depicts a pictorial representation of a bicycle and that representation appears on the upper surface of the puzzle board 14. In the right hand figure of FIG. 18 are shown three separate puzzle pieces 26 with syllables associated with each puzzle piece 26 imprinted on the upper surface 28 of each puzzle piece 26 such that when the puzzle pieces 26 are placed in their appropriate oddly shaped openings 24 the word BICYCLE will spell out.

When any one of the three puzzle pieces 26, which form the word BICYCLE, is placed in its respective oddly shaped opening 24 and is depressed the voice storage means 34 is activated as previously described and the phonetic enunciation of the syllable imprinted on the upper surface 28 of the depressed puzzle piece 26 is repeated. When the puzzle piece 26 in the left hand figure in FIG. 18 is inserted into its respective oddly shaped opening 24 and depressed the voice storage means 34 is activated as previously described and the word BICYCLE is enunciated, followed by the phonetic pronunciation of the syllable "BI" then "CY" and then "CLE." Thus, the method of teaching a child to read phonetically, by using the technique exemplified in FIG. 17, is further enhanced by exposing the child to the phonetic sound of syllables and also to the phonetic sound of words constructed from two or more syllables.

Figure 19:
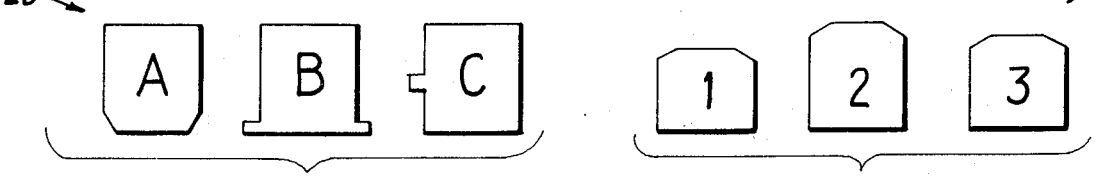
FIG. 19 is a pictorial representation of an alternative puzzle piece arrangement.

FIG. 19 shows three puzzle pieces 26 with a single letter of the alphabet imprinted on the upper surface 28 of each puzzle piece 26. When any one of the puzzle pieces 26 is inserted into its respective oddly shaped opening 24 and depressed the voice storage means 34 is activated, as previously described in the preferred and alternative embodiments and the letter of the alphabet imprinted on the depressed puzzle piece 26 is enunciated. In this manner, recognition of the imprinted letter of the alphabet with its matching sound is accomplished.

Figure 20:
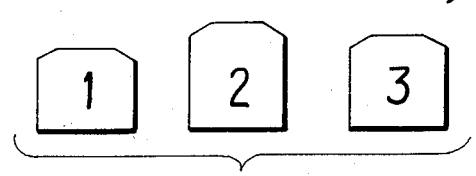
FIG. 20 is a pictorial representation of an alternative puzzle piece arrangement.

Likewise in FIG. 20, there are shown three puzzle pieces 26 with a numerical figure imprinted on the top surface 28 of each of the puzzle pieces 26. When any one of the puzzle pieces 26 is inserted into its respective oddly shaped opening 24 and depressed the voice storage means 34 is activated and describes the numeral depicted on the depressed puzzle piece 26. In this manner, numeral identification and recognition will be accomplished.

Figure 21:
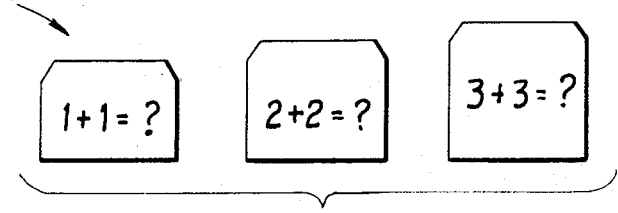
FIG. 21 is a pictorial representation of an alternative puzzle piece arrangement.

FIG. 21 shows three puzzle pieces 26 adapted to teach the technique of arithmetic. For example, when any one of the puzzle pieces 26 is inserted into its respective oddly shaped opening 24 and depressed the voice storage means 34 is activated and the arithmetical problem imprinted on the upper surface 28 of the puzzle piece 26 is enunciated together with the answer to the problem. Although FIG. 18 shows only problems of addition, it should be understood that such arithmetical problems may relate to subtraction, multiplication and division as well as other aspects of mathematics.

Figure 22:
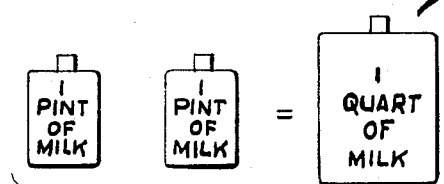
FIG. 22 is a pictorial representation of an alternative puzzle piece arrangement.

FIG. 22 illustrates that the educational puzzle may be adapted to teach the system of measurements. When any one of the puzzle pieces 26 is inserted into its respective oddly shaped opening 24 and depressed, the voice storage means 34 is activated as before described and the wording imprinted on the upper surface 28 of the puzzle piece 26 is enunciated. As in this case, the voice storage means 34 may emit the words "Two Pints Equal One Quart," when the largest sized puzzle piece 26, on the right hand side of FIG. 22, is depressed.

Figure 23:
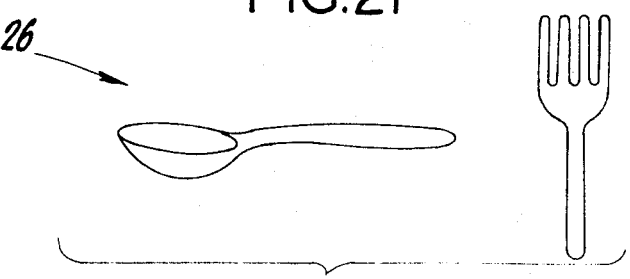
FIG. 23 is a pictorial representation of an alternative puzzle piece arrangement.
Figure 24:
FIG. 24 is a pictorial representation of an alternative puzzle piece arrangement.
Figure 25:
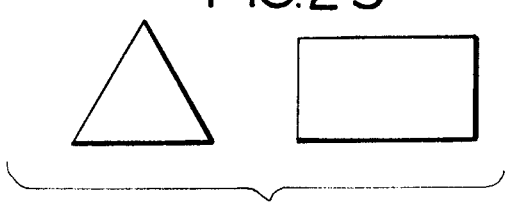
FIG. 25 is a pictorial representation of an alternative puzzle piece arrangement.

FIGS. 23 through 27 illustrate further alternatives to the present invention which comprise adapting the talking puzzle toy so that the user may differentiate between various objects, animals, shapes, sounds and colors. FIGS. 23 through 25 illustrate that the puzzle pieces 26 may be provided with the same configuration of the object, animal or shape to be identified. For example, in FIG. 25, the first puzzle piece 26 may have the same configuration as that of a triangle. Words need not be imprinted on the upper surface of the puzzle piece 26 but when that puzzle piece 26 is depressed after insertion in its oddly shaped opening 24 the voice mechanism 34 is activated and the word TRIANGLE is enunciated. As shown in FIG. 23, the actual shape of the puzzle piece 26 may be in the form of a spoon. Here again, the word spoon need not be imprinted on the upper surface 28 of the puzzle piece 26 but when the same is depressed the words "This is a Spoon" will be enunciated by the puzzle toy. Similarly, with FIG. 24 the same holds true. The shape of the puzzle piece 26 may have the configuration of that of an animal such as a chicken. Likewise the word CHICKEN need not be imprinted on the upper surface 28 of the puzzle piece 26 but when the same is depressed, the voice storage means 34 is activated as previously described and the words "This is a Chicken" will be enunciated. Therefore, FIGS. 23, 24 and 25 illustrate the fact that the user of the talking puzzle may be taught to recognize and to differentiate between various objects, various animals and various shapes.

Figure 27:
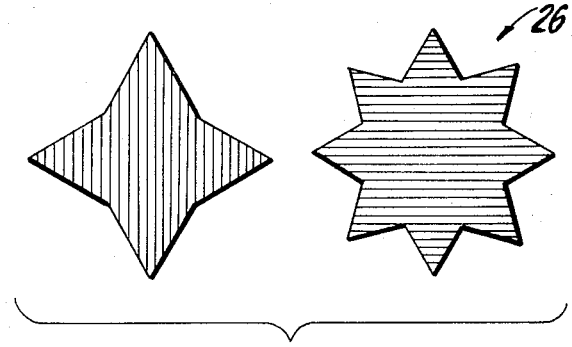
FIG. 27 is a pictorial representation of an alternative puzzle piece arrangement.

FIG. 27 shows another adaptation of the present invention which is used to teach a child to recognize and to differentiate between various colors. In this instance, each of the various shaped puzzle pieces 26 would be colored differently. As previously described, when a puzzle piece 26 is depressed, the voice storage means 34 is activated anda recorded voice is heard describing the color of that particular puzzle piece 26 which has been depressed. For example, the voice may say "This is the Color Blue." Thus, a child may be taught to identify the color, by the word which is descriptive thereof.

Figure 26:
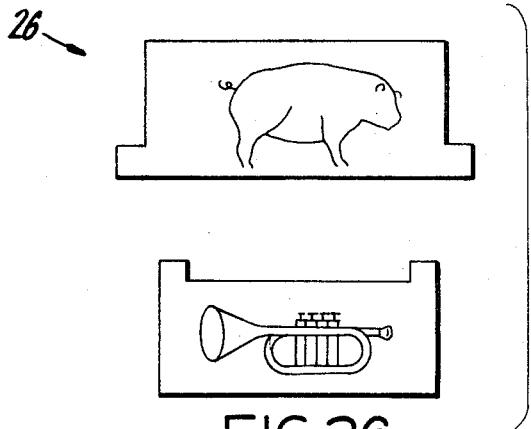
FIG. 26 is a pictorial representation of an alternative puzzle piece arrangement.

FIG. 26 illustrates that the present educational implement may be adapted to teach achild to identify various sounds. It may show a pictorial depiction of an object or an animal such as the pig illustrated on the top surface 28 of the puzzle piece 26. As previously described when the puzzle piece 26 is depressed a voice may emanate from the voice storage means 34 and may, in this particular case, repeat the words "A Pig Oinks" and then the sound of a pig oinking would be heard. Accordingly, a child may be taught to recognize various sounds.

Figure 28:
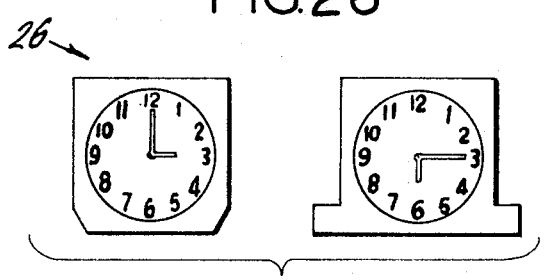
FIG. 28 is a pictorial representation of an alternative puzzle piece arrangement.

FIG. 28 illustrates that the present invention may be adapted to teach a child to tell the time of the day. In this case, each of the puzzle pieces 26 would have a pictorial depiction of a clock showing a different time for each puzzle piece 26. As previously described when a puzzle piece 26 is inserted in its matching oddly shaped opening 24 and depressed the voice storage means 34 is activated as before described and a voice may be heard telling the time of the day. For example, the voice may say "The time is three o'clock."

Figure 29:
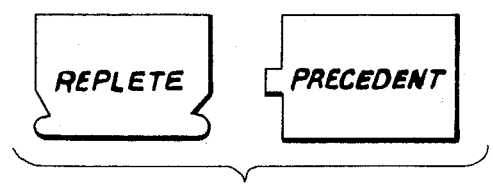
FIG. 29 is a pictorial representation of an alternative puzzle piece arrangement.

FIG. 29 illustrates a means for expanding the vocabulary of a child. Imprinted on the top surface 28 of each puzzle piece 26 is a word and when a puzzle piece 26 is depressed the voice storage means 34 is activated as before described and the meaning of that word imprinted on the depressed puzzle piece 26 is enunciated by the voice puzzle toy. Therefore, the child may utilize this educational toy as a dictionary.

Figure 30:
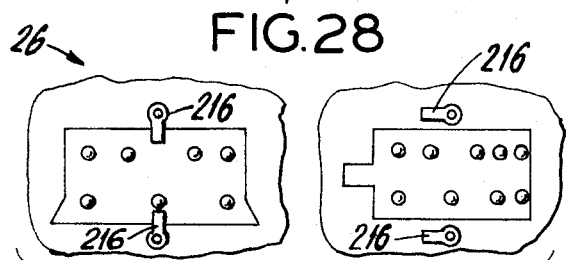
FIG. 30 is a pictorial representation of an alternative puzzle piece arrangement.
Figure 31:
FIG. 31 is a pictorial representation of an alternative puzzle piece arrangement.
Figure 32:
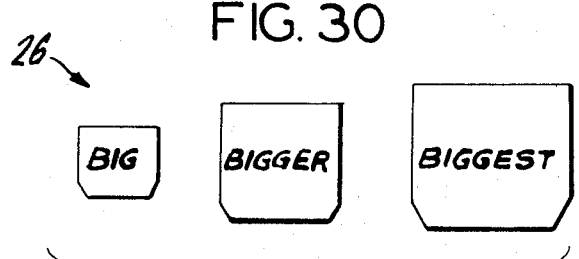
FIG. 32 is a pictorial representation of an alternative puzzle piece arrangement.
Figure 33:
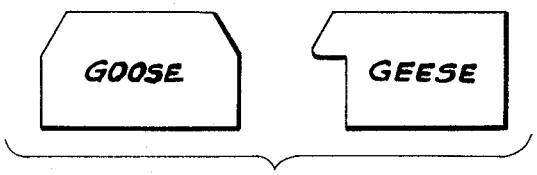
FIG. 33 is a pictorial representation of an alternative puzzle piece arrangement.

FIG. 30 illustrates the present invention as it is adapted, to teach the blind to read utilizing the braille method of reading. Letters, words, symbols or figures in braille may be adhered to or be an integral part of the upper surface 28 of the puzzle piece 26 so that each letter, word, symbol or figure is raised above the top surface of the puzzle piece 26 in such a manner that the user may be able to distinguish different letters, words, symbols or figures by touching and feeling with one's fingers. In some instances, the user may feel the outer configurations of the puzzle piece 26 and/or the varied shaped opening 24 and then proceed to match the puzzle piece 26 with its corresponding varied shaped opening 24, utilizing the sense of touch and thereby expanding the user's ability to differentiate shapes and sizes. When the puzzle piece 26 is inserted in its matching oddly shaped opening 24, and depressed, the voice storage means 34 is activated and the recorded voice emanating from the toy puzzle enunciates the letter or word that is depicted in braille on the upper surface 28 of the puzzle piece 26. Thus, a blind child will associate the audible recorded sound with its matching raised letter or word in braille on the upper surface 28 of the puzzle piece 26. FIG. 30 also shows means whereby a very young blind child, or a blind child who may not be sufficiently dexterous so as to be able to match the puzzle pieces 26 with the varied shaped openings 24, may also utilize the present educational implement. Holding down clips 216 are shown pivotally fixed to the board 14, in locations above and below each varied shaped opening 24. Utilizing these clips 216, one may lock the puzzle inserts 26 in position. In this manner, the child would only have to depress the puzzle piece 26 in order to activate the voice storage means 34. There would be not necessity for a young, or non-dexterous blind child to be burdened with the problem of matching puzzle pieces 26 with varied shaped opening 24. However, as the child gets older or more dexterous, the clips 216 can be moved to the unlocked position as shown in the right hand figure of FIG. 30 and then the child can derive further enjoyment from the present invention, by utilizing it as a toy puzzle.

It will be obvious to those skilled in the art of teaching braille that the present invention is a great asset as a learning tool, for in the past, it has been an individualized and laborious task to teach the blind to read. Utilizing the present invention, however, allows a child to work at his own pace without the aid of a tutor.

It should be also noted that the pivotal clips 216 may be used to lock the puzzle pieces 24 in position, when the board 14 is being changed for a different one, or the pivotal clips 216 may be used when the educational toy is stored away, thus preventing the possibility of some puzzle pieces 26 falling out and being lost or mislaid.

Figure 35:
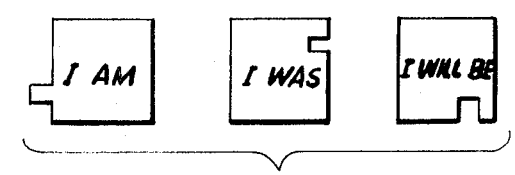
FIG. 35 is a pictorial representation of an alternative puzzle piece arrangement.
Figure 34:
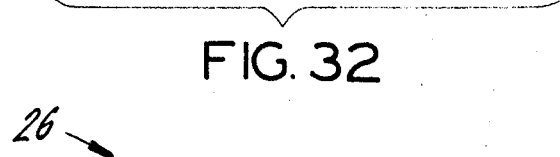
FIG. 34 is a pictorial representation of an alternative puzzle piece arrangement.

FIGS. 31 through 33 and 35 illustrate the application of the present invention as it may be utilized to further one's knowledge of a language and its grammar such as the learning of comparative words, the differentiation between singular and plural, the teaching of the tenses, antonyms and synonyms and so on. In each case an explanation of the imprinted word on the upper surface 28 of the puzzle piece 26 would be enunciated when the puzzle piece 26 would be depressed in its matching oddly shaped opening 24, causing the voice storage means 34 to be activated as before described. As illustrated in FIG. 34, the present invention may be adapted to teach foreign languages. Instead of having one word imprinted on each puzzle piece 26 as previously described, each puzzle piece 26 has imprinted on its upper surface 28 two words, one positioned above the other, one in the English language and the other a translated version of the foreign language to be learned. When the puzzle piece 26 is inserted into its matching opening 24 and depressed the voice storage means 34 is activated as before described and a voice may be heard which repeats the word which is shown in English and also is followed by the enunciation of the translation of that word in the desired foreign language. FIG. 35 shows the present invention adapted to teach the French language. When the puzzle piece 26 with the English word LITTLE and the French word PETIT below it imprinted on the upper surface 28 is depressed the voice storage means 34 will be activated as before described and the voice storage means will enunciate the word LITTLE and then enunciate the French translation which is PETIT. Thus, it is obvious that the present invention may be utilized in the art of teaching foreign languages.

It will be recognized by those skilled in the art that the objects of the present invention have been achieved by providing a toy puzzle game which emits sound in accordance with verbiage imprinted upon the various puzzle pieces and functions as a puzzle and an educational device for familiarizing children with the printed and spoken words. Similarly, the mechanism as described above provides a broad spectrum means for co-ordinating printed words with other audible sounds.

While in accordance with the patent statutes a preferred and alternative embodiments have been shown and described in detail it is particularly understood that the present invention is not limited thereto or thereby.

We claim:

1. A sound puzzle comprising a board having a plurality of varied shaped openings therein, said board being releasably supported by a lower housing member, a sound reproduction system disposed in said lower housing member, a plurality of varied shaped puzzle pieces insertable in their matching varied shaped openings and adapted to activate said sound reproduction system, and means for activating said sound reproduction system including at least one sound pick-up means and a sound storage means, each of said varied shaped puzzle pieces being adapted to communicate with said sound pick-up means, a sound amplifier being in communication with said sound pickup means, a sound transmission means being connected between said sound pick-ups means and said sound amplifier, said sound transmission means including a transmission member having laterally extending sound transmission arms.

2. A voice puzzle comprising a board having a plurality of varied shaped openings therein, a lower housing member supporting said board, a plurality of varied shaped puzzle pieces having the same shapes of the varied shaped openings, each puzzle piece adapted to fit into only one opening in the board having the same shape, each of said puzzle pieces having a word, sound or phrase associated therewith, voice pick-up means adapted to be activated by downward pressure applied to said puzzle pieces inserted in said varied shaped openings, a voice storage means disposed in spaced relationship with said voice pick-up means, said voice storage means having thereon discrete sections of vocal representations of each word, sound or phrase associated with a respective puzzle piece, a sound amplifier disposed remotely from said voice storage means, sound transmission means connected between said voice pick-up means and said sound amplifier to transmit sound from said voice storage means to said sound amplifier, said sound transmission means including a main transmission member having laterally extending sound transmission arms, a motor in communication with said voice storage means, and circuit means disposed between said inserted puzzle piece and said voice pick-up means for closing an electrical circuit, to activate said motor when said electrical circuit is closed by means of a source of electrical energy.

3. A voice puzzle according to claim 2 wherein when said puzzle piece is depressed a word, sound or phrase associated with said depressed puzzle piece will be emitted through said sound amplifier.

4. A voice puzzle according to claim 3 wherein a cover plate is disposed between said board and said plurality of voice pick-up means, said cover plate having a plurality of holes therein in registry with each of said voice pick-up means.

5. A voice puzzle according to claim 4 wherein each of said varied shaped openings has a lip formed in the bottom thereof defining a hole and a bottom surface to said oddly shaped opening, said hole being in alignment with said hole in said cover plate.

6. A voice puzzle according to claim 5 wherein each puzzle piece is provided with an upper section being oddly shaped and having a downwardly extending protrusion which is engageable in said hole formed by said lip.

7. A voice puzzle according to claim 6 wherein a plurality of leaf springs are connected to each of said transmission arms, each of said leaf springs having its rear edge connected to said transmission arms and its distal end being in alignment with said holes in said board and said cover plate.

8. A voice puzzle according to claim 7 wherein an upwardly extending grommet is connected to the upper surface of said leaf spring at its distal end, said grommet having an upper end, a rod connected to said upper end and extending upwardly therefrom, said rod extending through said hole in said cover plate.

9. A voice puzzle according to claim 8 wherein a cap is connected to the upper end of each rod, said cap being electrically conductive, said cover plate having electrically conductive conduits disposed on the upper surface thereof, said electrical conductive elements forming a switch arrangement in conjunction with said cap, said electrically conductive elements being connected between said motor and said electrical source of energy.

10. A voice puzzle according to claim 9 wherein each of said leaf springs are provided with a voice pick-up member depending from the lower surface thereof at its distal end, said leaf spring being bendable downwardly when said cap is depressed under downward pressure from said puzzle piece, said voice pick-up member contacting said voice storage means under said downward pressure of said puzzle piece.

11. A voice puzzle according to claim 10 wherein said leaf sprng acts to disengage said voice storage means from said voice pick-up means when said puzzle piece is released.

12. A voice puzzle according to claim 11 wherein the downward movement of said cap contacts the said electrical conduits closing said electrical circuits causing said motor to be activated and rotating said voice storage means.

13. A voice puzzle according to claim 12 wherein each puzzle piece has an electric circuit associated therewith the depression of said puzzle piece closes said circuit to activate said voice storage means, said electric circuit being opened when said depression of said puzzle piece is released.

14. A voice puzzle according to claim 13 wherein each of said voice pick-up members are disposed in alignment with discrete sections on the voice storage means such that the contacting of the voice pick-up means with said voice storage means will transmit only that voice representation disposed beneath said voice pick-up means.

15. A voice puzzle according to claim 14 wherein said voice storage means and board are changeable, said lower housing being provided with means for the removal and insertion of voice storage means.

16. A voice puzzle according to claim 15 wherein said voice pick-up means is a needle.

17. A voice puzzle according to claim 16 wherein said voice storage means is in the form of a record disc.

18. A voice puzzle according to claim 17 wherein said lower housing means is provided with a slot therein into which a record may be slid and a support plate in communication with said slot.

19. A voice puzzle according to claim 18 wherein said drive motor is adapted to rotate a drive shaft which is disposed beneath said support plate, said support plate having a hole therein in alignment with said drive shaft.

20. A voice puzzle according to claim 19 wherein said record disc is provided with a downwardly protruding hub with an aperture therethrough, said hub being engaged in said hole in said support plate, said hub adapted to enage said drive shaft to permit the rotation of said record when said motor is activated.

21. A voice puzzle according to claim 20 wherein a springloaded retractable pin extends through said board and into said lower housing means and is adapted to pass through said hole in the said record hub engaging said drive shaft to maintain the rotative motion of the record.

22. A voice puzzle according to claim 21 wherein a guide means is disposed within said lower housing means on said support plate and is adapted to guide said record in position when the record is inserted in the slot such that the downwardly extending hub of the record becomes engaged in the hole in the support plate.

23. A voice puzzle according to claim 22 wherein said drive shaft is provided with an upper end having ratchet teeth disposed thereon, said ratchet teeth engageable with said hub such that when said drive shaft rotates said record disc will rotate.

24. A voice puzzle according to claim 23 wherein an ejector mechanism is adapted to disengage said record disc from said hole in said support plate when it is desired to change said record disc.

25. A voice puzzle according to claim 24 wherein said record disc is slidable out of said slot in said lower housing when said retractable pin is urged upwardly out of enagement with said hole in said record hub and said ejector mechanism is activated.

26. A voice puzzle according to claim 15 wherein said voice storage means is a tape belt.

27. A voice puzzle according to claim 26 wherein a magnetic head comprises said voice pick-up means.

28. A voice puzzle according to claim 27 wherein a pair of rollers are mounted within said lower housing and are adapted to releasably support said tape belt.

29. A voice puzzle according to claim 28 wherein said tape belt is provided with discrete sections of audibly translated sound, each of said discrete sections being in alignment with its respective magnetic head.

30. A voice puzzle according to claim 29 wherein each of said magnetic heads is connected to said sound amplifier.

31. A voice puzzle according to claim 30 wherein a motor is in communication with one of said rollers to activate the movement of said one of said rollers when a puzzle piece is depressed.

32. A voice puzzle according to claim 31 wherein said lower housing is provided with a removable front wall, said front wall being removed to permit the removal of said tape belt and the insertion of another tape belt.

33. A voice puzzle according to claim 32 wherein an idler roller is disposed between said pair of rollers and is movable between a loaded position and a removal position such that said tape belt is loosened on said pair of rollers for removal of said tape belt and is tightened on said pair of rollers when said idler roller is moved to its loaded position.

34. A voice puzzle according to claim 15 wherein said puzzle pieces are releasably engageable in their respective varied shaped openings and are movable in their respective oddly shaped openings between a rest position and a depressed position.

35. A voice puzzle according to claim 34 wherein a plurality of rods are horizontally movably engageable in each of said oddly shaped openings, each of said rods is adapted to engage within a vertical slot in said downwardly extending protrusion in said puzzle piece.

36. A voice puzzle according to claim 35 wherein a center rod controls the movement of said rods such that all of said rods are disengageable from said slots in said puzzle pieces and said puzzle pieces thereby become removable from said oddly shaped openings.

37. A voice puzzle according to claim 2 wherein said puzzle pieces take the form of objects and the voice storage means has provided thereon audible information identifying said object.

38. A voice puzzle according to claim 2 wherein said puzzle pieces are colored and the voice storage means has provided thereon audible information identifying said colors.

39. A voice puzzle according to claim 2 wherein said puzzle pieces are provided with protrusions thereon and said voice storage means has provided thereon audible information identifying said protrusions.

40. A voice puzzle according to claim 2 wherein said puzzle pieces are provided with words imprinted thereon and said voice storage means has provided thereon the translation of the respective words into another language.

41. A voice puzzle according to claim 2 wherein each of said puzzle pieces are provided thereon with a mathematical problem and said voice storage means is provided thereon with an audible solution to the mathematical problem.

42. A voice puzzle according to claim 2 wherein each of said puzzle pieces take the form of a physical object which has three dimensional form and said voice storage means has provided thereon an audible identification of said physical object.

43. A voice puzzle according to claim 2 wherein each of said puzzle pieces has a word imprinted thereon and said voice storage means is provided thereon with audible definitions of said imprinted words.

44. A voice puzzle according to claim 15 wherein said board is provided with an over extending edge about each of said oddly shaped openings forming a channel between said over extending edge and said lip around the inner periphery of each oddly shaped opening.

45. A voice puzzle according to claim 44 wherein each of said oddly shaped puzzle pieces are provided at the lower edge of the upper portion thereof with an outwardly flared rim such that the puzzle piece may be snap-fitted into said opening and move vertically within the limits of the channel formed between said over extending edge of said oddly shaped opening and said lip.

46. A voice puzzle according to claim 2, including at least one leaf spring pivotally connected to at least one of said sound transmission arms.

47. A voice puzzle according to claim 46 wherein a apring is connected between the distal end of said leaf spring and said at least one sound transmission arm to urge said leaf spring in one direction, a stop disposed on said at least one sound transmission arm contiguous to said leaf spring adapted to limit the pivotal movement of said leaf spring in the direction urged by said spring.

48. A voice puzzle according to claim 2 wherein pivotable clips are disposed adjacent each of said oddly shaped openings to maintain said puzzle pieces in said openings.

49. A voice puzzle according to claim 2 wherein each of said puzzle pieces have a word in braille thereon and said voice storage means is provided thereon with audible definitions of said word.

50. A voice puzzle according to claim 2 wherein each of said puzzle pieces have a letter thereon and said voice storage means is provided thereon with audible sounding of said letter.

* * * * *